(12) United States Patent
Ajani

(10) Patent No.: US 10,880,423 B2
(45) Date of Patent: Dec. 29, 2020

(54) HOLDER

(71) Applicant: Aslam Ajani, Dallas, TX (US)

(72) Inventor: Aslam Ajani, Dallas, TX (US)

(73) Assignee: Aslam Ajani, Dallas, TX (US)

( * ) Notice: Subject to any disclaimer, the term of this patent is extended or adjusted under 35 U.S.C. 154(b) by 0 days.

(21) Appl. No.: 16/453,726

(22) Filed: Jun. 26, 2019

(65) Prior Publication Data

US 2020/0045157 A1 Feb. 6, 2020

Related U.S. Application Data

(63) Continuation-in-part of application No. 16/051,275, filed on Jul. 31, 2018, now abandoned.

(51) Int. Cl.
*A47B 23/04* (2006.01)
*F16M 11/20* (2006.01)
*H04M 1/04* (2006.01)
*F16M 13/02* (2006.01)

(52) U.S. Cl.
CPC ............ *H04M 1/04* (2013.01); *F16M 13/022* (2013.01); *A45F 2200/0516* (2013.01); *A47B 23/044* (2013.01); *F16M 11/2085* (2013.01); *F16M 2200/08* (2013.01)

(58) Field of Classification Search
USPC ....... 248/447, 448, 454, 455, 456, 457, 458, 248/460, 463, 461, 165, 166; 16/221, 16/225, 226, 248, 227, 280, 282, 283, 16/285, 287, 289, 290, 304, 305, 343, 16/347; 108/6, 7, 136, 115; 40/658, 647, 40/666
See application file for complete search history.

(56) References Cited

U.S. PATENT DOCUMENTS

| | | | | |
|---|---|---|---|---|
| 2,031,097 A * | 2/1936 | Bucky | .................... | A61B 6/447 248/123.2 |
| 8,162,283 B1 * | 4/2012 | Royz | ..................... | F16M 11/10 248/455 |
| 8,464,995 B2 * | 6/2013 | Yang | ...................... | F16M 13/00 248/455 |
| 8,733,716 B2 * | 5/2014 | Li | ........................ | F16M 11/041 248/188 |
| 2007/0120034 A1 * | 5/2007 | Sparling | ................ | A47B 23/00 248/458 |
| 2009/0273163 A1 * | 11/2009 | Sorenson | ............... | A63C 10/14 280/613 |
| 2012/0248048 A1 * | 10/2012 | Wu | ........................ | F16M 11/10 211/26 |
| 2014/0252180 A1 * | 9/2014 | Mau | ....................... | F16M 11/10 248/123.11 |
| 2015/0227165 A1 * | 8/2015 | Feng | ...................... | F16M 11/38 361/679.56 |
| 2015/0334858 A1 * | 11/2015 | Gao | ......................... | E05D 3/02 248/447 |
| 2016/0291636 A1 * | 10/2016 | Lee | ........................ | E05F 5/02 |
| 2017/0085828 A1 * | 3/2017 | Shen | ...................... | H04N 5/64 |

* cited by examiner

*Primary Examiner* — Alfred J Wujciak
(74) *Attorney, Agent, or Firm* — Sul Lee

(57) ABSTRACT

A holder is provided. The holder includes a base, a platform, a first leg, and a second leg. The platform includes a fastener for attaching an object to the platform. The first leg is hingeably coupled to the base and the platform. The second leg is also hingeably coupled to the platform. Each of the first leg and the second leg has a first section and a second section that are hingeably coupled to each other.

4 Claims, 13 Drawing Sheets

HOLDER

BACKGROUND

Holders or stands may be provided to hold a cell phone or other object in place for use or storage. Often the holders are hard to store and can only place the object in one position. This can be cumbersome and time consuming.

Holders may benefit from improvements.

SUMMARY

In one aspect of the present invention, a holder is provided. According to an embodiment, the holder includes a base and a platform. The platform is configured to enable an object to be removably attached to the platform. The holder further includes a leg interconnecting the base to the platform. The holder is configured to be folded into a collapsed position. The holder is configured to extend to a first operative position.

According to an embodiment, a holder includes a base and a platform. The platform is configured to allow an object to be removably attached to the platform. The holder further includes a leg interconnecting the base to the platform. The leg is pivotally connected to the platform. The platform is configured to assume a first operative position in which the platform engages the base and forms an angle with the base.

According to an embodiment, the holder includes a base, a platform having a fastener for attaching an object to the platform, a first leg hingeably coupled to the base and the platform, and a second leg hingeably coupled to the base and the platform, each of the first leg and the second leg having a first section and a second section that are hingeably coupled to each other.

According to an embodiment, the platform comprises a disc that rotates about an axis that is orthogonal to the platform.

According to an embodiment, the fastener is an adhesive layer.

According to an embodiment, the base has an overhang at an edge of the base.

According to an embodiment, an inner-facing surface of the platform is contoured to mate with the overhang.

Other aspects of the disclosed invention will become apparent from the following detailed description, the accompanying drawings and the appended claims.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 8:
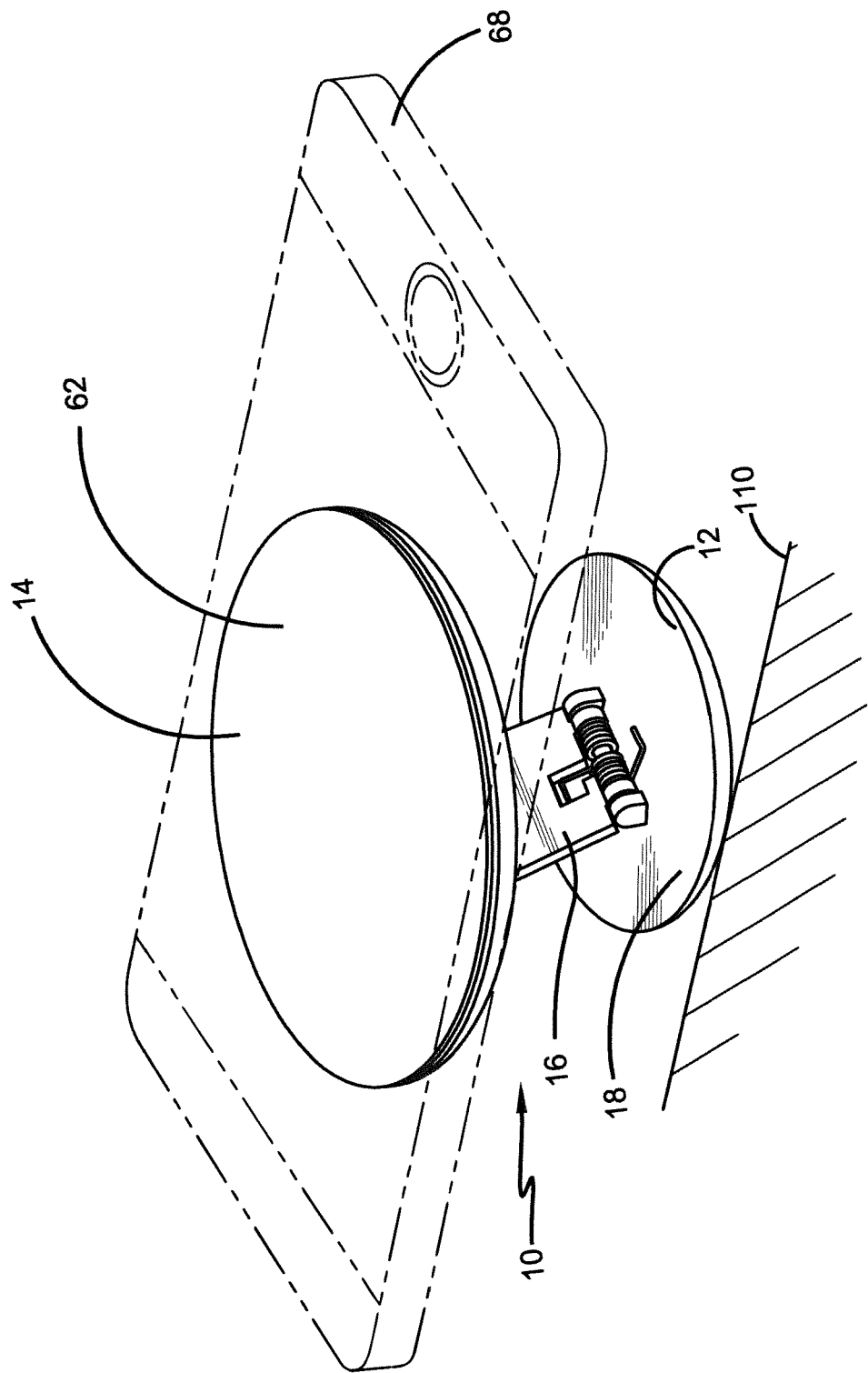
FIG. 8 is a top and side perspective view of the holder in the extended position and with a cell phone attached to the top side of the platform, according to an embodiment of the disclosure.

Throughout the present description, the terms "upper", "lower", "top", "bottom", "left", "right", "front", "forward", "rear", and "rearward" shall define directions or orientations with respect to the holder as illustrated in FIG. 8. It will be understood that the spatially relative terms "upper", "lower", "top", "bottom", "left", "right", "front", "forward", "rear", and "rearward" are intended to encompass different orientations of the holder in use or operation in addition to the orientation depicted in the figures. For example, if the holder in the figures is turned over, elements described as "upper" elements or features would then be "lower" elements or features. The terms "clockwise" and "counterclockwise" are directions as viewed in FIG. 4.

Figure 1:
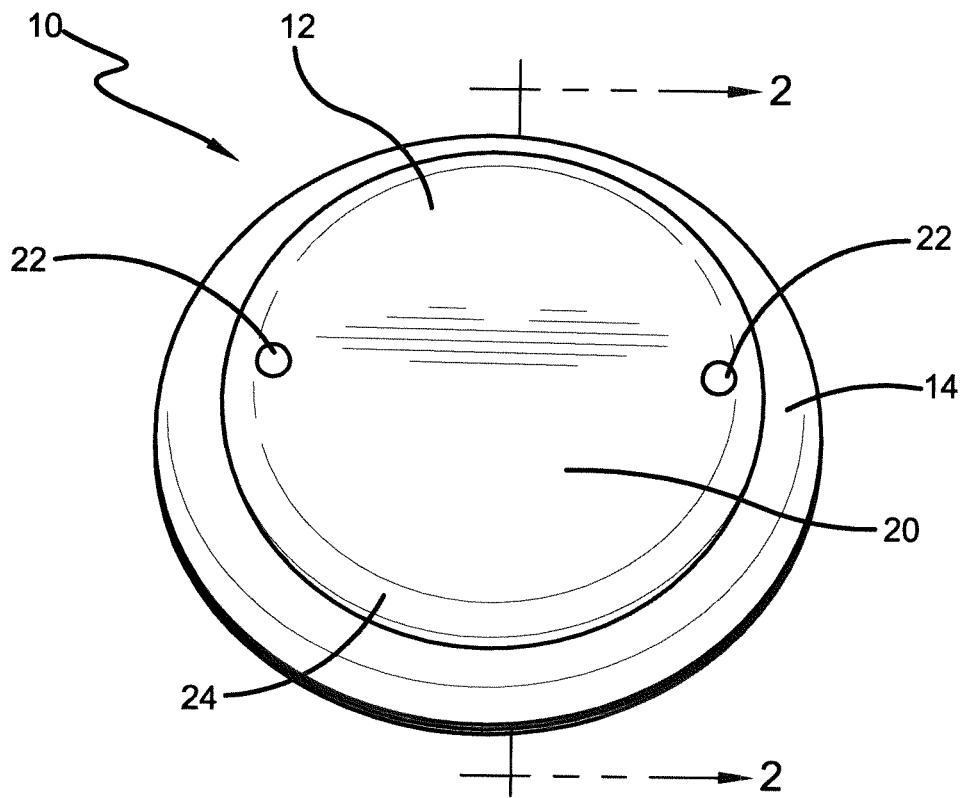
FIG. 1 is a bottom perspective view of the holder folded in the collapsed position, according to an embodiment of the disclosure.
Figure 2:
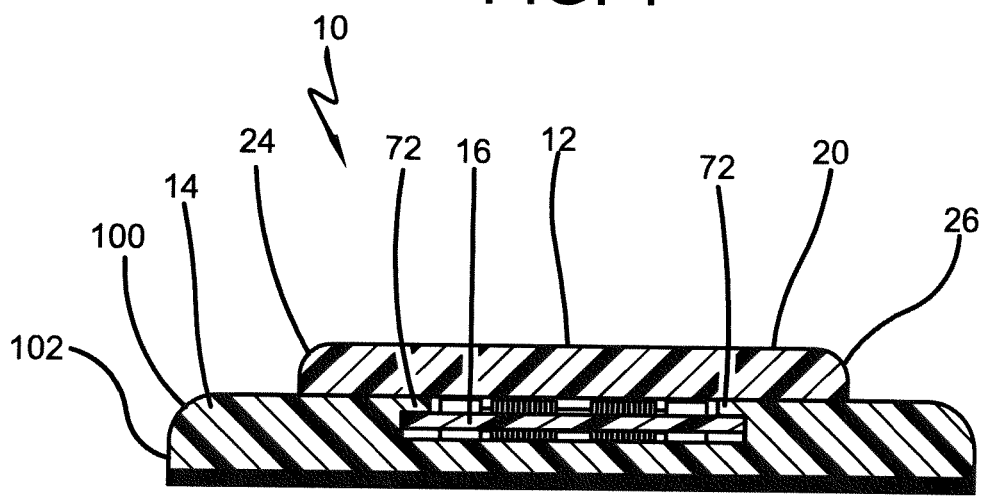
FIG. 2 is a sectional view taken along line 2-2 of FIG. 1, according to an embodiment of the disclosure.
Figure 3:
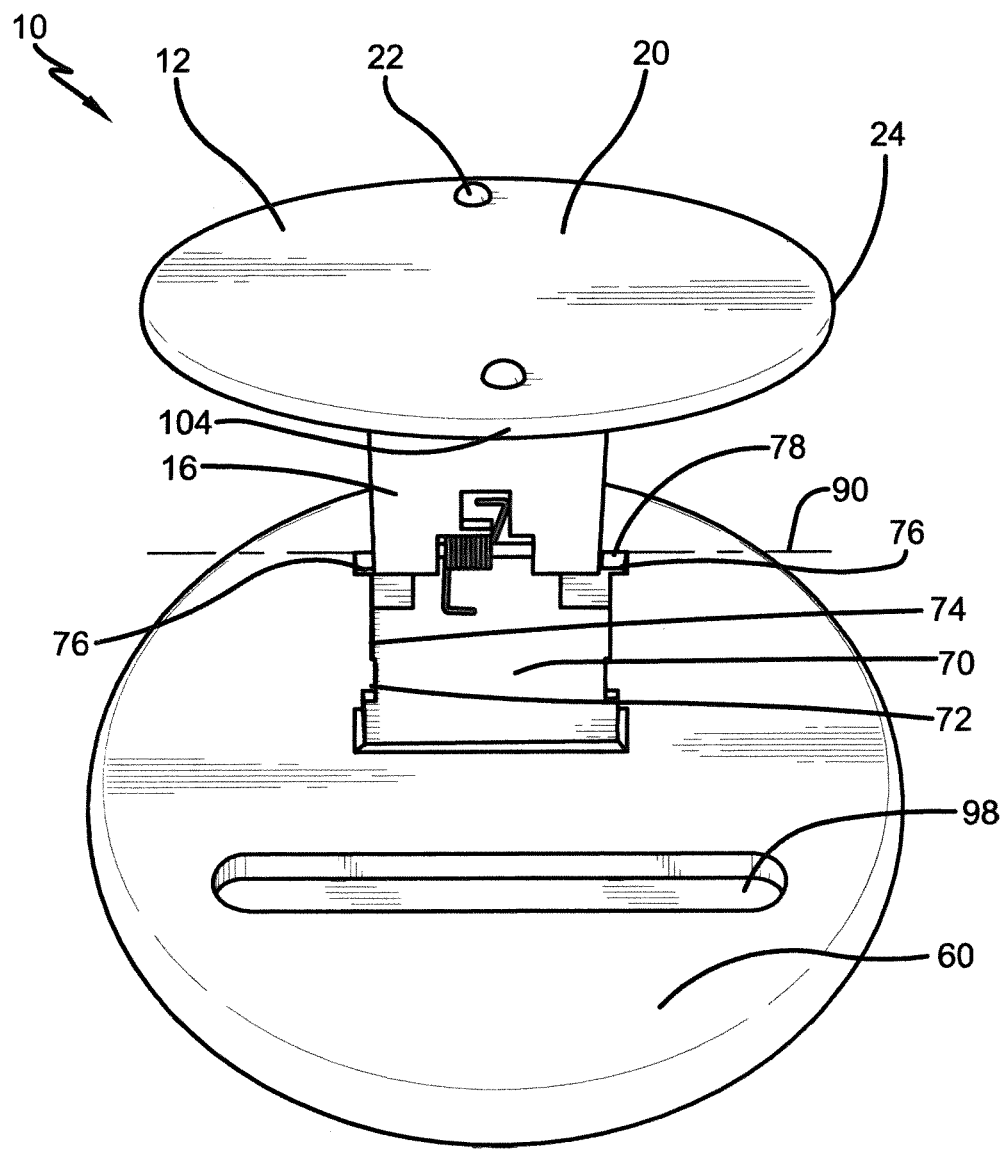
FIG. 3 is a bottom and front perspective view of the holder of FIG. 1 in the extended position, according to an embodiment of the disclosure.
Figure 4A:
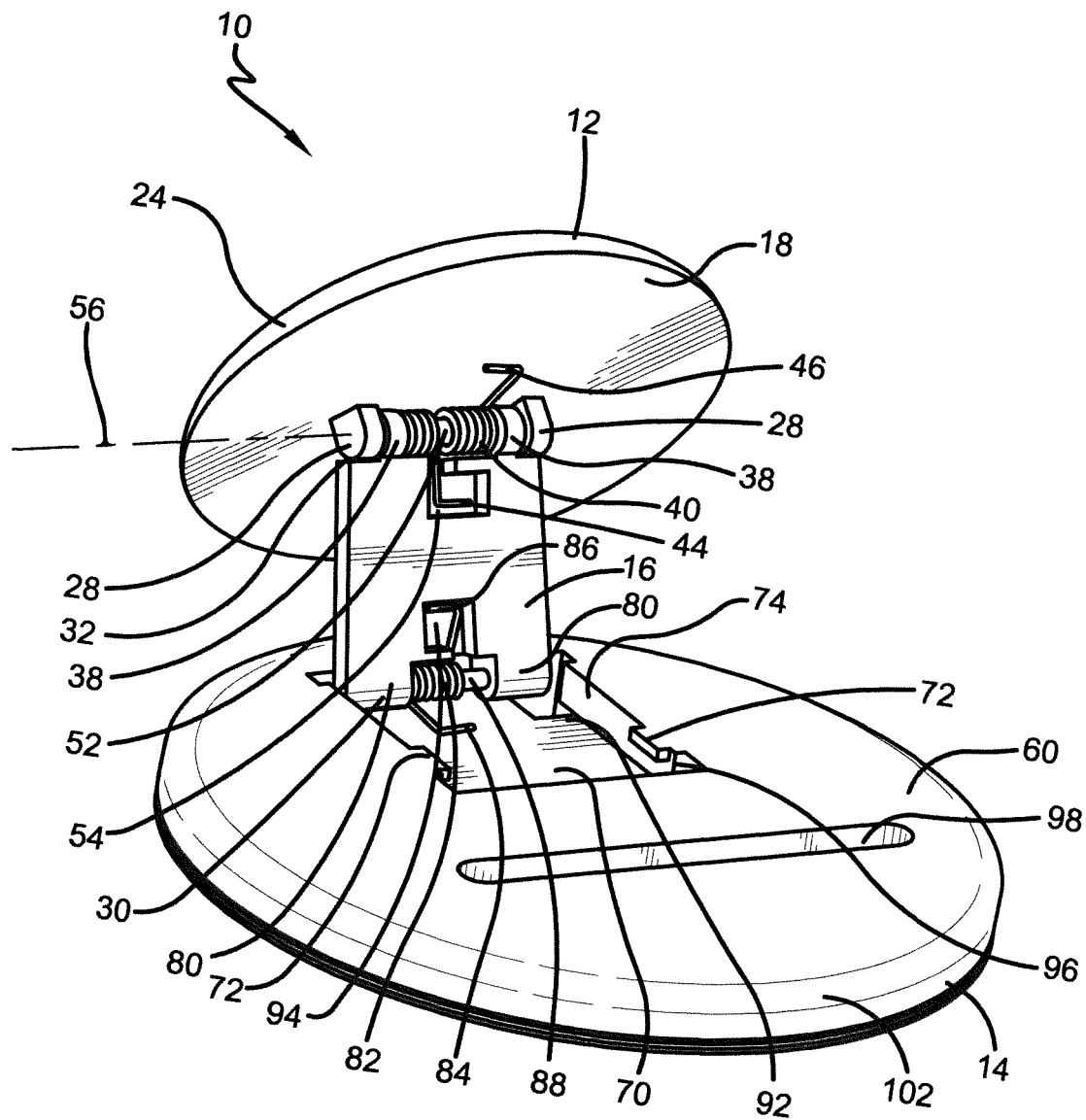
FIG. 4A is bottom, front and side perspective view of the holder of FIG. 1 in the extended position but with the base rotated slightly counterclockwise, according to an embodiment of the disclosure.
Figure 4B:
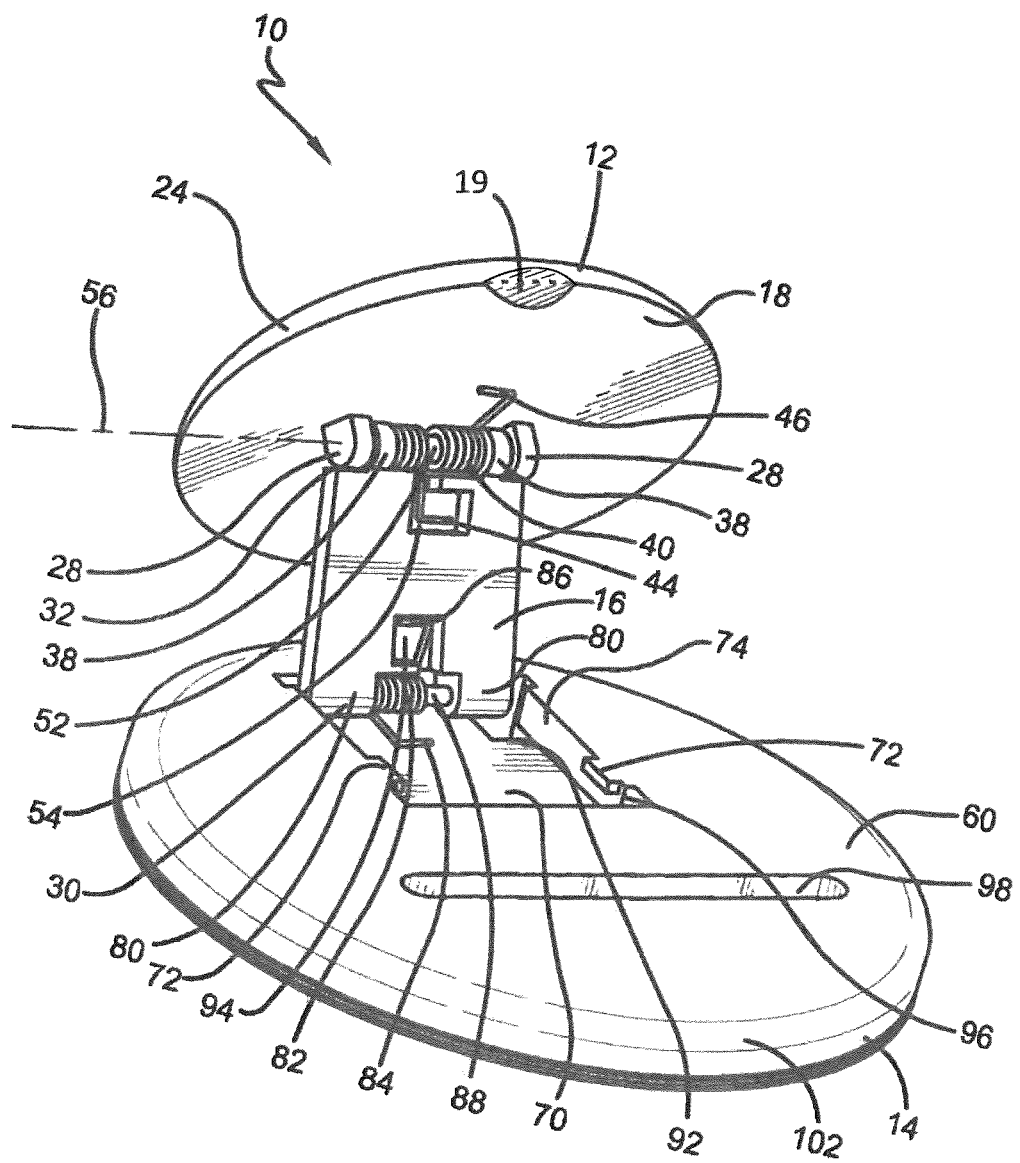
FIG. 4B is a bottom, front and side perspective view of the holder similar to FIG. 4A with a notch on a top side and at a peripheral end of the base 12, according to an embodiment of the disclosure.

Referring to FIG. 3, a holder 10 is shown. The holder 10 includes a base 12, a platform 14, and a leg 16 interconnecting the base 12 to the platform 14. The base 12 is a plate comprising a top side 18 (FIGS. 4A & 4B) facing the platform 14 and a bottom side 20 facing away from the platform 14. According to an embodiment, the base 12 could be any suitable shape such as a square, triangular, or star shaped. According to an embodiment, the bottom side 20 may include one or more protrusions formed on the bottom side 20 of the base 12. For example, as seen in FIGS. 1 and 3, the bottom side 20 may include a pair of protrusions 22 formed at diametrically opposite locations of a peripheral end 24 of the base 12. As illustrated in FIG. 2, the edge 26 of the peripheral end 24 of the bottom side 20 may be rounded or convexly curved. However, according to an embodiment, the edge 26 may be squared or be at a flat angle. As illustrated in FIG. 4, the top side 18 of the base 12 includes a pair of inverted u-shaped bearings 28 that extend towards the base 12.

Figure 9:
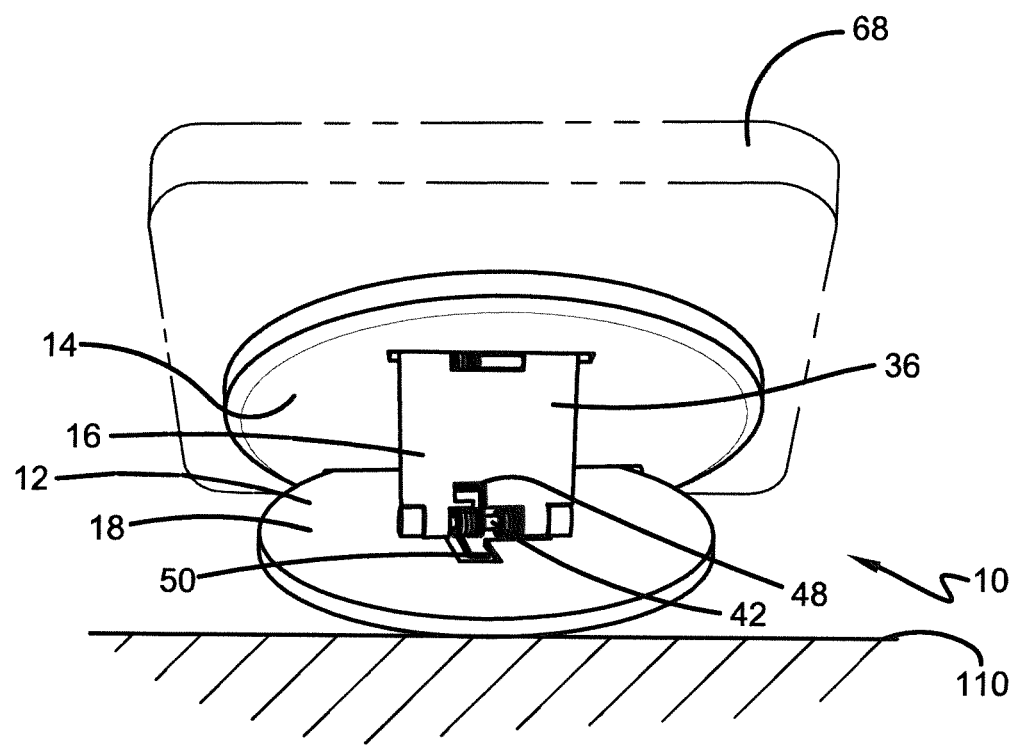
FIG. 9 is a rear perspective view of the holder in the second operative position and with a cell phone attached to the adhesive layer, according to an embodiment of the disclosure.

The leg 16 may be substantially rectangular in shape and includes a first end 30 and a second end 32 (FIGS. 4A & 4B). The leg 16 also has an inner side 34 (see FIG. 3) facing the platform 14 when the holder is in the collapsed position and an outer side 36 (see FIG. 9) facing the base 12 when the holder 10 is in the collapsed position. Referring to FIG. 4, the leg 16 includes a pair of first axle holders 38 located on corners at the second end 32 of the leg 16 and between the bearings 28 of the base 12. The holder 10 includes a first and second helical torsion springs 40, 42 (respectively) positioned side-by-side with each other and between the first axle holders 38. The first torsion spring 40 includes first and second L-shaped spring legs 44, 46 (respectively). According to an embodiment, angle between the spring legs 44, 46 of the first torsion spring 40 may be approximately ninety degrees. The second torsion spring 42 includes first and second L-shaped spring legs 48, 50 (FIG. 9). According to an embodiment, the angle between the spring legs 48, 50 of the second torsion spring 42 may be approximately ninety degrees. A first axle 52 extends through the first and second torsion springs 40, 42, the first axle holders 38 of the leg 16 and the u-shaped bearings 28 of the base 12. The first axle 52 enables the base 12 to rotate relative to the leg 16 about a rotating axis 56 that is parallel to the top side 18 of the base 12. The second spring leg 46 of the first torsion spring 40 extends toward the base 12 and abuts against the top side 18 of the base 12. According to an embodiment, the top side 18 of the base 12 may have a recess in which the second spring leg 46 of the first torsion spring 40 may be seated. The first spring leg 44 of the first torsion spring 40 is seated in a recess 54 formed in the inner side 34 (as view in FIG. 4) of the leg 16. In this arrangement, the spring legs 48, 50 operate to bias the base 12 in the counterclockwise direction (as viewed in FIG. 4) relative to about the rotational axis 56.

As illustrated in FIG. 9, the second spring leg 50 of the second torsion spring 42 extends toward the base 12 and abuts against the top side 18 of the base 12. According to an embodiment, the top side 18 of the base 12 may have a recess in which the second spring leg 50 of the second torsion spring 42 may be seated. The first spring leg 48 of the second torsion spring 42 is seated in a recess 58 formed in the outer side 36 (as viewed in FIG. 9) of the leg 50. In this arrangement, the spring legs 48, 50 operate to bias the base 12 in the clockwise direction (as viewed in FIG. 4) relative to the rotational axis 56. Thus, the first and second torsion springs 40, 42 bias the base 12 in opposite directions and urges the base 12 in a position perpendicular to the leg 16 as illustrated in FIG. 3.

Figure 5:
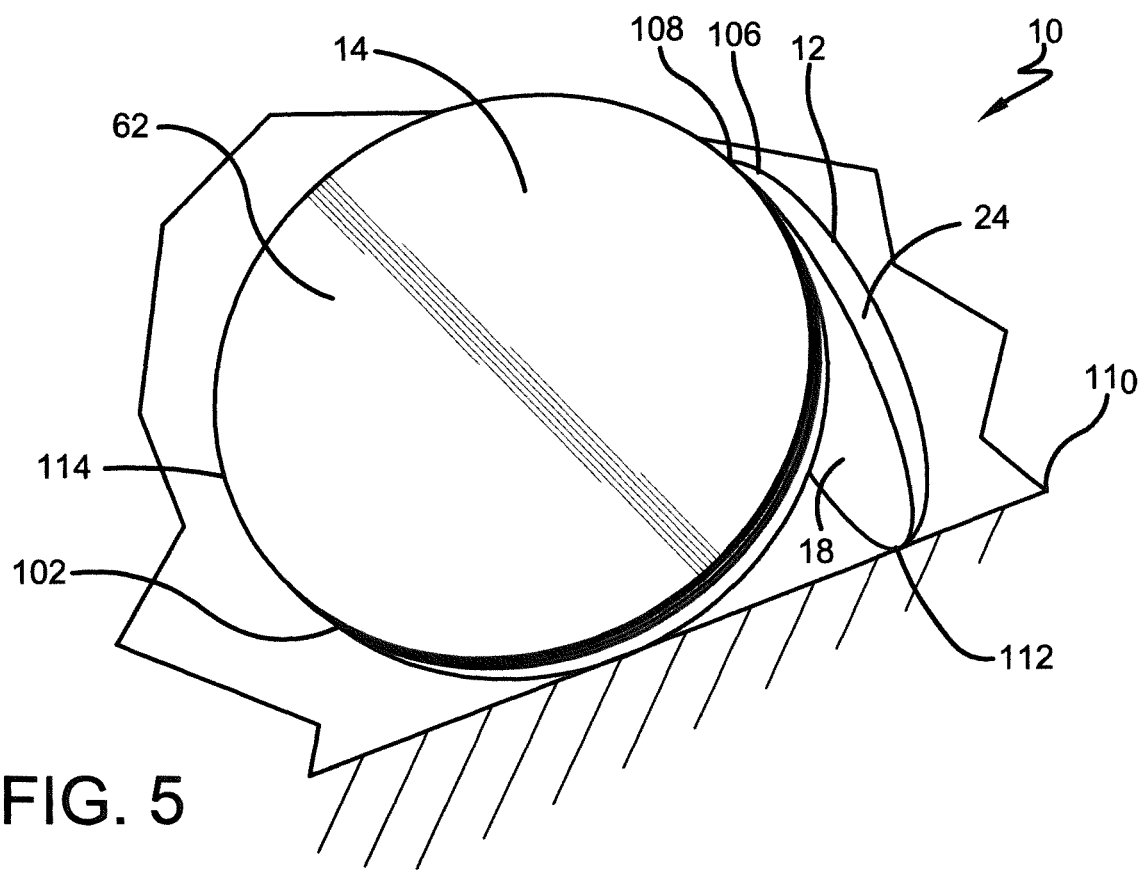
FIG. 5 is a top and side perspective view of the holder in a third operative position, according to an embodiment of the disclosure.
Figure 6:
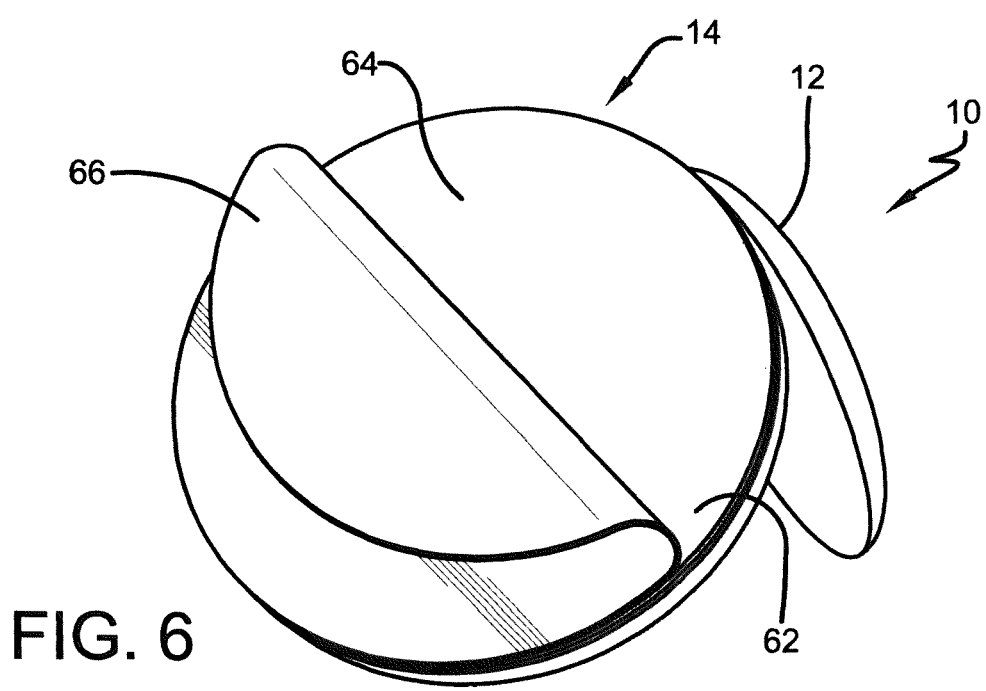
FIG. 6 is a view similar to FIG. 5 but with the liner partially peel away from the adhesive layer, according to an embodiment of the disclosure.

Referring to FIGS. 4-6 and 8, the platform 14 is a plate. According to an embodiment, the platform could be any suitable shape such as a square, triangular, star shaped, or any irregular shape. The platform 14 has a larger surface area than that of the base 12. According to an embodiment, the platform 14 and the base 12 may have the same or substantially the same surface area. The platform 14 comprises a bottom side 60 facing the base 12 when the holder 10 is in the collapsed position and a top side 62 facing away from the base 12 when the holder is in the collapsed position. As illustrated in FIG. 2, the edge 100 of the peripheral end 102 of the bottom side 60 of the platform 14 is rounded or convexly curved. However, according to an embodiment, the edge 26 may be squared or be at a flat angle. As illustrated in FIGS. 5 and 6, the top side 62 includes an adhesive layer 64. The adhesive layer 64 is covered by a paper liner 66. As illustrated in FIG. 6, the paper liner 66 may be peeled off to expose the adhesive layer 64 for use to removably attach objects 68, such as a cell phone, to the platform 14. Alternatively, instead of an adhesive layer, a hook and loop type fastener such as Velcro® may be secured on the top side 62 of the platform and the object 68 to removably attach the object 68 to the platform. Alternatively, instead of an adhesive layer, magnets or magnet attracting metal and magnet combination may be secured on the top side 62 of the platform 14 and the object 68 to removably attach the object 68 to the platform 14. Alternatively, instead of an adhesive layer, the object 68 may be removably adhered via suction to a suction cup secured on the top side 62 of the platform. Other suitable ways may be provided to removably attach the object 68 to the platform 14. As seen in FIGS. 3, 4A and 4B, the bottom side 60 of the platform 14 includes a recess 70 that is formed to receive the leg 16. According to an embodiment, a pair of inwardly projecting tabs 72 is integrally formed with the platform on opposite longitudinal sides 74 of the recess 70. The platform 14 may be formed of a plastic or other suitable material of sufficient elasticity such that tabs 72 may flex upwardly and downwardly. The recess 70 includes a pair of bearings 76 (FIG. 3) provided on the opposite longitudinal sides 74 of the recess 70 and located near an end 78 (FIG. 3) of the recess 70.

Figure 10:
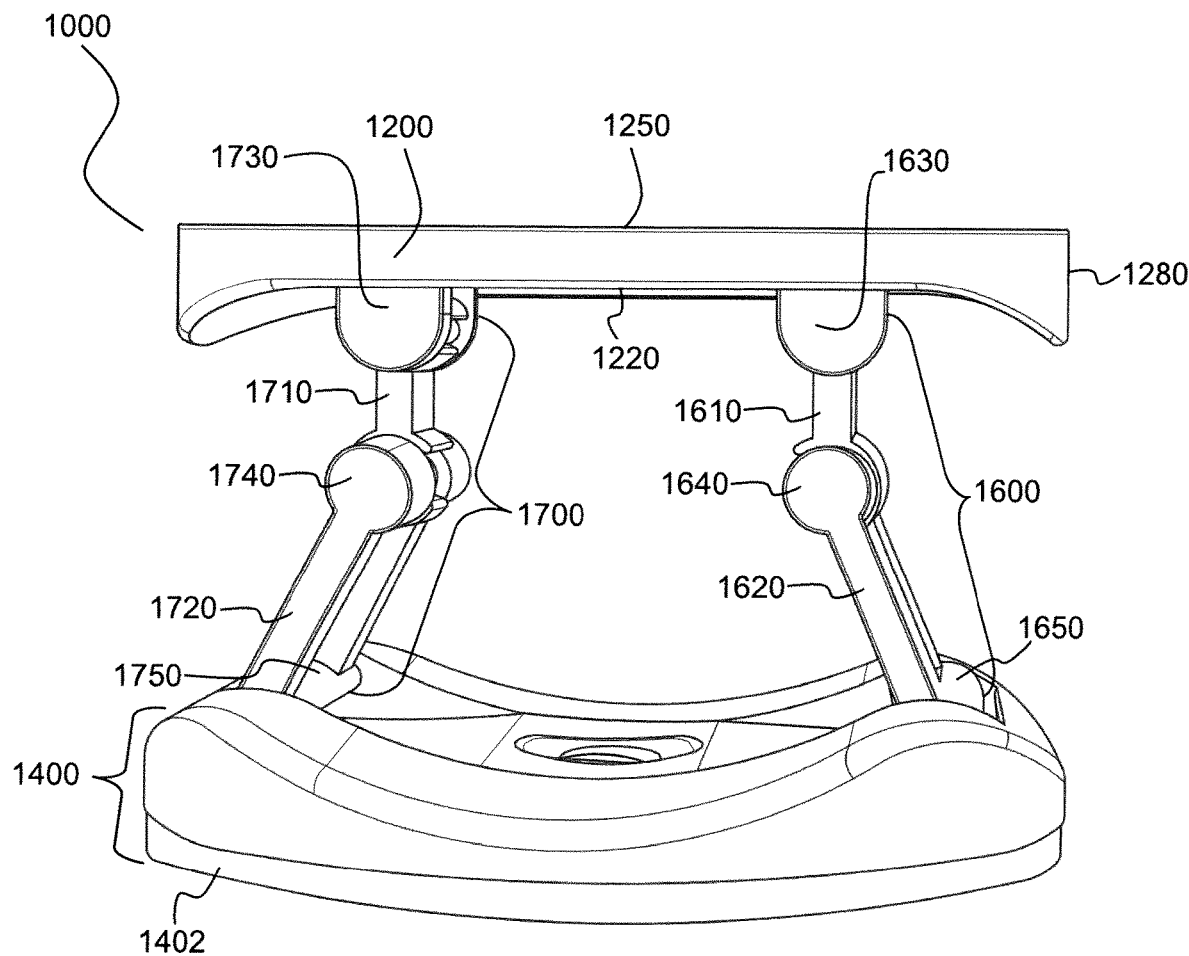
FIG. 10 is a side perspective view of the holder with two legs in the extended position, according to an embodiment of the disclosure.

Referring to FIG. 10, according to an embodiment, the platform 14 may have two parts: a main body 141 and a rotating plate 146. The rotating plate 146 has a first side 147 that coincides with the top side 62 of the platform 14 such that the adhesive layer is on the first side 147. The second side 148 of the rotating plate 146 has a protruding ring 149 with a groove that is integrally formed with the rotating plate 146 to allow the rotating plate 146 to snap onto the main body 141 of the platform 14. The main body 141 has a first side 142 and a second side 143. The second side 143 coincides with the bottom side 60 of the platform 14. The first side 142, which faces the rotating plate 146 has a circular recess 144 with at least one groove that corresponds to a groove of the protruding ring 149 to allow the rotating plate 146 to securely snap onto the main body 141. According to an embodiment, at least one of the protruding ring 149 and the circular recess 144 has a continuous groove along its respective circumference edge.

Referring to FIG. 4, the leg 16 also includes a pair of second axle holders 80 integrally formed on the first end 30 of the leg 16 and located on opposite corners of the leg 16. The second axle holders 80 are also located between the bearings 76 of the platform 14. The holder 10 includes a third helical torsion spring 82 positioned between the second axle holders 80. The third torsion spring 82 includes first and second L-shaped spring legs 84 and 86, respectively. According to an embodiment, the angle between the spring legs 84, 86 of the third torsion spring 82 may be approximately ninety degrees. A second axle 88 extends through the third torsion spring 82, the second axle holders 80 of the leg 16 and the bearings 76 of the platform 14. According to an embodiment, the second axle 88 enables the leg 16 to pivot or rotate relative to the platform 14 about a pivot axis 90 (FIG. 3). The first spring leg 84 of the third torsion spring 82 extends toward the platform 14 and abuts against the bottom 92 of the recess 70. The second spring leg 86 of the third torsion spring 82 is seated in a matching recess 94 formed in the inner side 34 (as view in FIG. 1) of the leg 16. In this arrangement, the spring legs 84, 86 operate to bias the base 12 in the counterclockwise direction (as viewed in FIG. 4) relative to the pivot axis 90.

Figure 7:
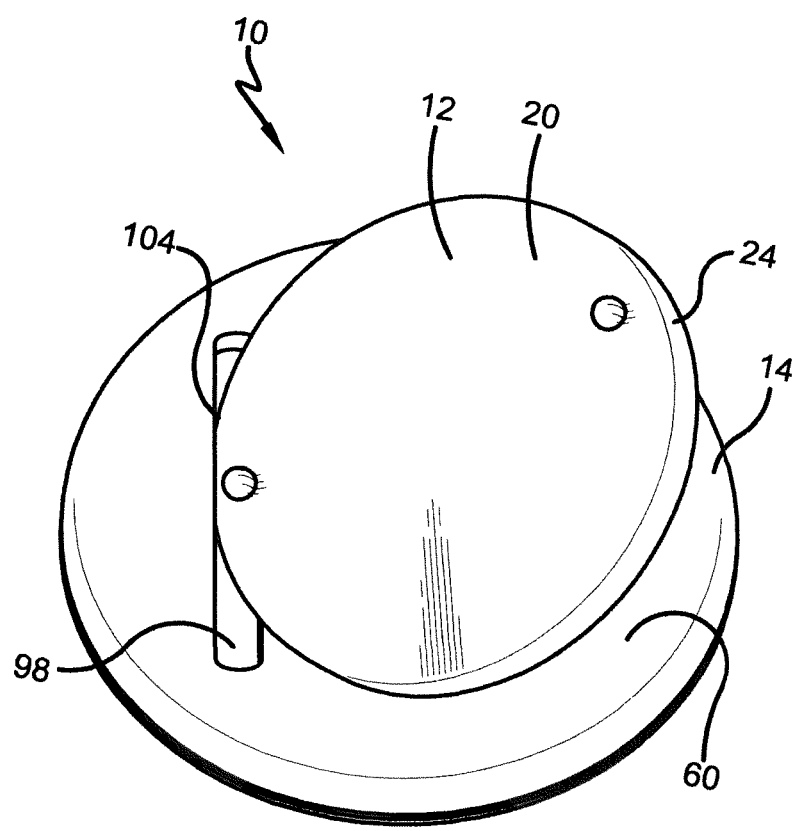
FIG. 7 is a bottom perspective view of the holder in the second operative position, according to an embodiment of the disclosure.

The recess 70 includes an inner end portion 96 opposite the pivot axis 90 that is matched to receive the bearings 28, first axle holders 38, first axle 52, and torsion springs 40, 42 when the holder 10 is in the collapsed position. An elongated groove 98 is formed on the bottom side 60 of the platform 14 and is oriented parallel to the rotating axis 56 and the pivot axis 90. The groove 98 is sized to slidably receive a portion 104 of the peripheral end 24 of the base 12 as illustrated in FIG. 7. The axles 52, 88 may be made of metal or other suitable hard material. The torsion springs may be made of stainless steel or other suitable material. The other parts of the holder 10 may be made of plastic or other suitable material.

In operation, FIGS. 1 and 2 show the holder 10 folded in a collapsed position. In the collapsed position, the recess 70 receives the leg 16 and related components, and the tabs 72 extend under the outer side 36 of the leg 16 to detachably retain the leg 16 in the recess 70. In the collapsed position, the top side 18 of the base 12 abuts against the bottom side 60 of the platform 14 and is parallel to the platform 14. In the collapsed position, the holder 10 is compact with a small footprint for easy storage. To place the holder 10 in an extended position as shown in FIG. 8, a user grasps the peripheral end 24 of the base 12 preferably at a location furthest away from the pivot axis 90 and pulls the base 12 in the counterclockwise direction with sufficient force that causes the leg 16 to move counterclockwise about the pivot axis 90 and bend the tabs 72 away from the leg 16 to allow the leg 16 to move out of the recess 70. According to an embodiment (and as illustrated in FIG. 4B), the top side 18 of the base 12 may have a notch 19 at a peripheral end 24 that allows a user to slide in a fingernail to pry the base 12 away from the base 14. The biasing action of the third torsion spring 82 urges the leg 16 to pivot counterclockwise about the pivot axis 90 until the leg 16 reaches an extended position as shown in FIG. 3. In the extended position, the leg 16 is oriented perpendicular to the base 12 and platform 14, and the base 12 is parallel to the platform 14 due to opposing forces of the torsion springs 40, 42 being applied to the base 12. To aid the user in grasping the base 12 to pull it, a small portion at the peripheral end 24 may be removed or a portion of the peripheral end maybe be raised away from the platform 14 to increase the gap between the portion of the peripheral end 24 grasped by the user and the bottom side 60 of the platform 14. The extended position may define a first operative position in which the object 68, such as the cell phone, is removably attached to the adhesive layer 64 on the top side 62 of the platform 14.

To place the holder 10 in a second operative position as shown in FIGS. 7 and 8, the user pivots the leg 16 clockwise about pivot axis 90, rotates the base 12 clockwise, and inserts the portion 104 of the peripheral end closest to the groove 98 into the groove 98. The base 12 is then placed flat on a supporting surface 110 and the object 68 is then attached to the adhesive layer 64 on the top side 62 of the platform 14. The groove 98 is sized to engage the peripheral end 24 such that the frictional force between the peripheral end 24 and portions of the platform 14 that define the groove 98 is sufficient to prevent removal of the peripheral end 24 of the base 12 from the groove 98 when the base 12 is placed on the supporting surface 110. In the second operative position, the top side 18 of base 12 forms an acute angle with the bottom side 60 of the platform 14. To place the holder 10 in a third operative position as shown in FIG. 5, the portions 106, 108 of the peripheral ends 24, 102 of the base 12 and platform 14, respectively, closest to the pivot axis 90 are moved towards each other until they contact each other to define a v-shaped configuration. The holder 10 is then placed on the supporting surface 110 such that the portions 112, 114 of the peripheral ends 24, 102 of the base and platform opposite the portions 106, 108, respecitvely, contact the supporting surface 110. The object 68 is then attached to the adhesive layer 64 on the top side 62 of the platform 14.

To place the holder 10 back in the collapsed position, a user folds or pivots the leg 16 clockwise while keeping the base 12 parallel with the platform 14 with sufficient force to overcome the biasing forces from the torsion springs 40, 42 and tabs 72 such that the tabs 72 move away from the leg 16 and allow the leg 16 and related components to be inserted into the recess 70. The holder 10 is in a more compact position than any of the operative positions.

Figure 11:
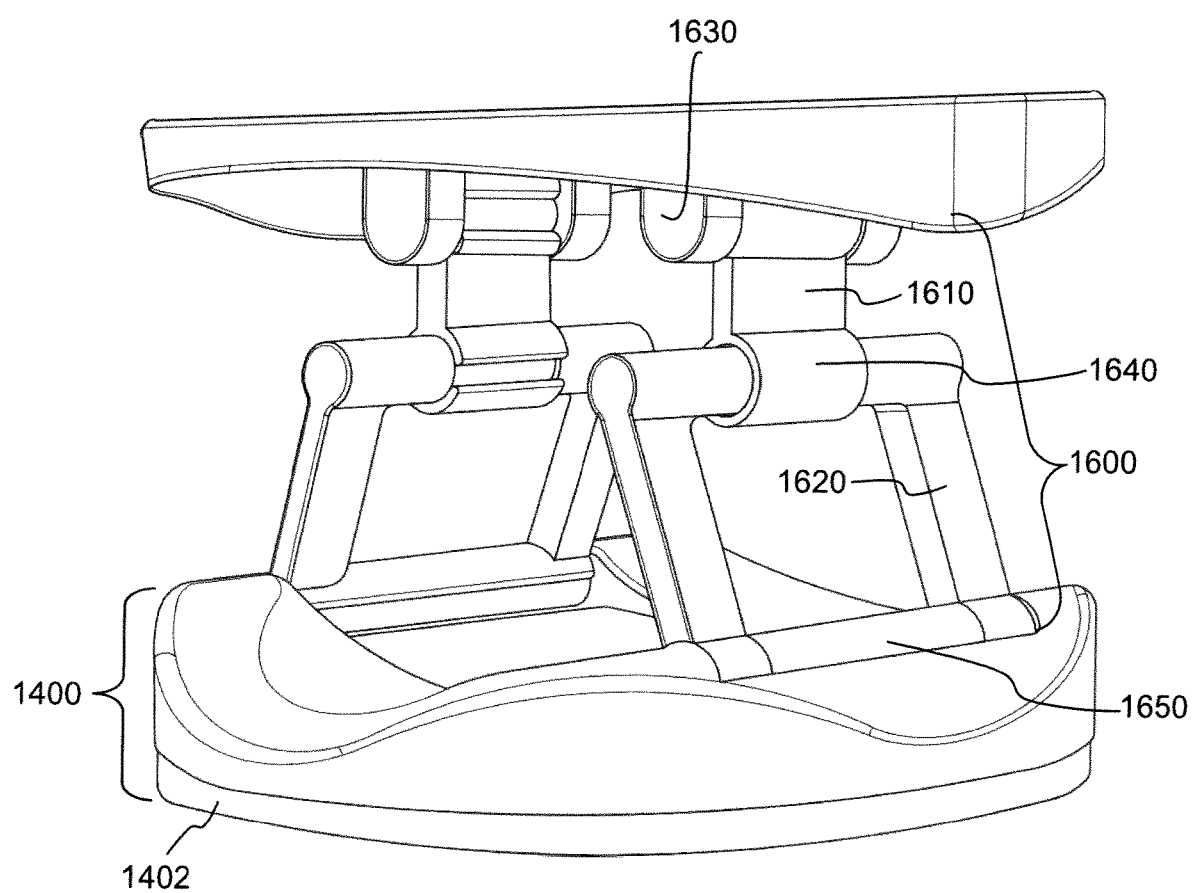
FIG. 11 is a perspective view of the holder with two legs in the extended position, according to an embodiment of the disclosure.
Figure 12:
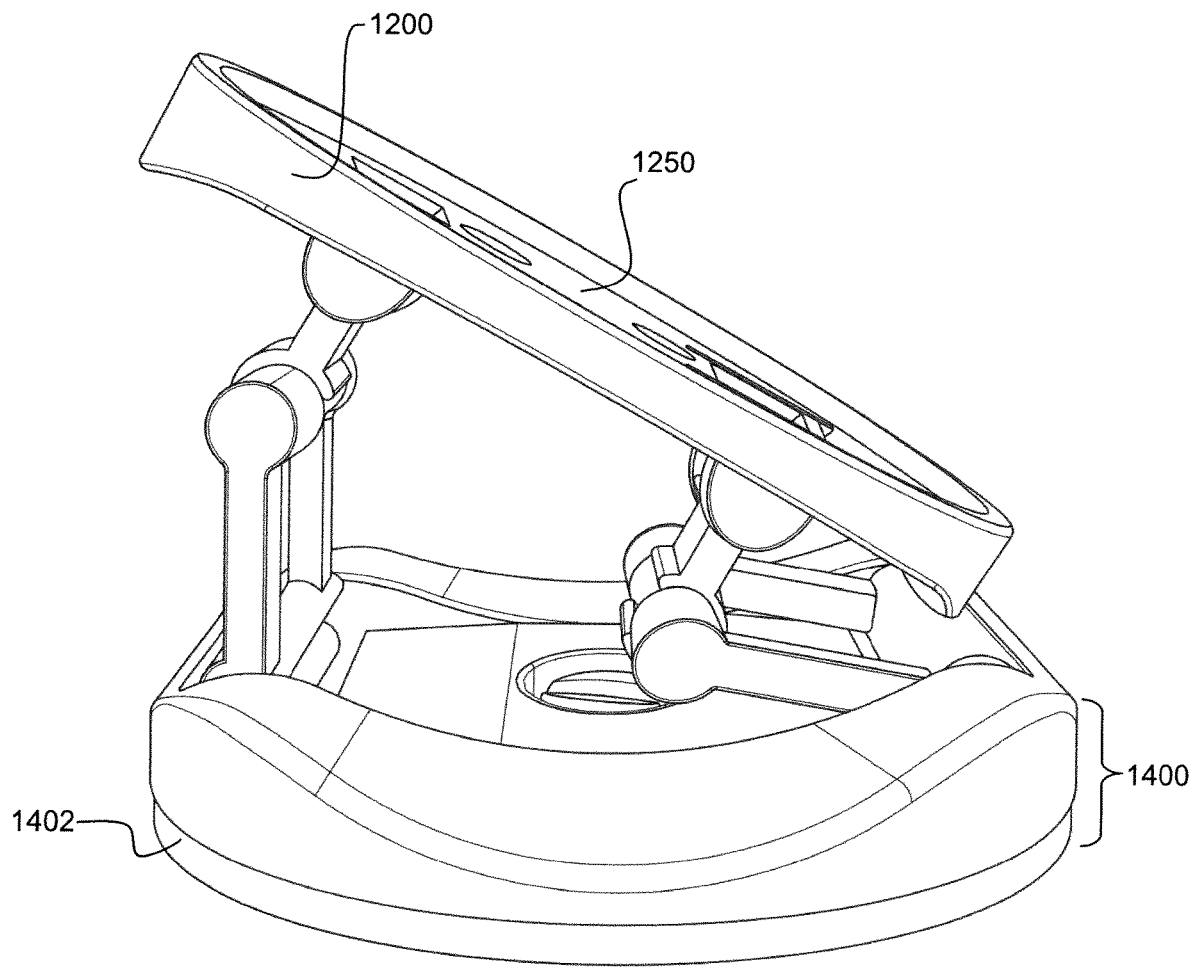
FIG. 12 is a side perspective view of the holder with two legs in an inclined position, according to an embodiment of the disclosure.

FIGS. 10-14 illustrate a holder 1000, which is an alternate configuration to holder 10. The holder 1000 includes a base 1200, a platform 1400, and first and second legs 1600 and 1700, respectively, interconnecting the base 1200 to the platform 1400. The base 1200 is a plate comprising a outer side 1250 facing away from the platform 1400 and an inner side 1220 facing the platform 1400. According to an embodiment, the top side may be hollowed out to accommodate discs or plates that have images, logos and such as illustrated in FIG. 12. According to an embodiment, the base 1200 and the platform may be formed as any suitable shape such as a square, triangular, or star shaped. As illustrated in FIGS. 10-14, an overhang may be formed at the edge 1280 of the base 1200. Alternatively, though not illustrated, the base 1200 may be a formed as a flat disc with no overhang.

The first leg 1600 has a first section 1610 and a second section 1620 that are hingeably coupled at middle pivot 1640. The first section 1610 is also hingeably coupled to the base 1200 at base pivot 1630, which is positioned on the inner side 1220 of the base 1200. The second section 1620 of the first leg 1600 is also hingeably coupled to the platform 1400 at platform pivot 1650, which is positioned on the inner side of the platform 1400. The second leg 1700 has a first section 1710 and a second section 1720 that are hingeably coupled at middle pivot 1740. The first section 1710 is also hingeably coupled to the base 1200 at base pivot 1730, which is positioned on the inner side 1220 of the base 1200. The second section 1720 of the second leg 1700 is also hingeably coupled to the platform 1400 at platform pivot 1750, which is positioned on the inner side of the platform 1400. Each of the pivots 1630, 1640, 1650, 1730, 1740, and 1750 may be formed based on any hinge type.

Figure 14:
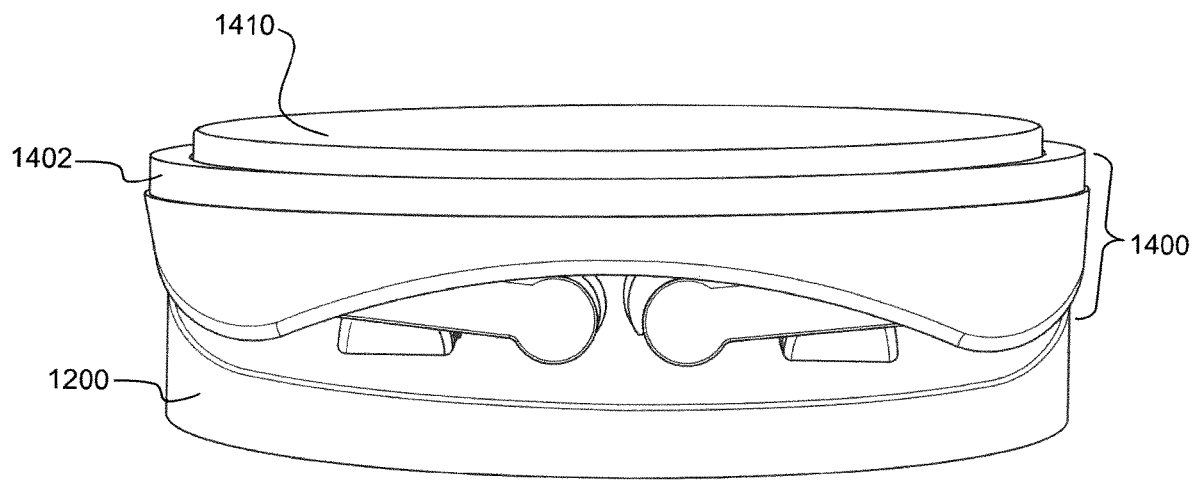
FIG. 14 is a side perspective view of the holder with two legs in a collapsed position, according to an embodiment of the disclosure.

In FIG. 11, the first and second sections for each of the legs 1600 and 1700 seem to be hingeably coupled to form a T hinge. However, the first section and the second section for each of the legs 1600 and 1700 and may also be hingeably coupled based on other hinge types. The arrangement of hingeable legs 1600 and 1700 that are each hingeably coupled to the base 1200 and the platform 1400 allow the holder 1000 to form many positions, including the fully extended position illustrated in FIGS. 10 and 11, many inclined positions (one of which is illustrated in FIG. 12), and the collapsed position as illustrated in FIG. 14. According to an embodiment, the length of each of the first section and the second section of the legs 1600 and 1700 are set such that in the collapsed position, each section lays parallel to the base 1200 and the platform 1400. As illustrated in FIG. 10, the first section 1610 of the first leg 1600 and the first section 1710 of the second leg 1700 have the same length, and the second section 1620 of the first leg 1600 and the second section 1720 of the second leg 1700 have the same length.

In alternative embodiments that are not illustrated, the lengths of the first section 1610 of the first leg 1600 and the first section 1710 of the second leg 1700 may be different while still allowing them to lay flat when in the collapsed position. Also, the lengths of the second section 1620 of the first leg 1600 and the second section 1720 of the second leg 1700 may be different, according to an embodiment while still allowing them to lay flat when in the collapsed position.

According to an embodiment, the gap between the base pivots 1630 and 1730 is shorter than the gap between the platform pivots 1650 and 1750. In other embodiments, the the gap between the base pivots 1630 and 1730 may be equal to or longer than the gap between the platform pivots 1650 and 1750.

According to an embodiment, the platform 1400 could be any suitable shape such as a square, triangular, star shaped, or any irregular shape. According to an embodiment, the outer-facing surface of the platform 1400 is a disc 1402 that may be rotated about an axis that is orthogonal to the surface of the platform 1400. According to an embodiment, the platform 1400 and the base 1200 may have the same or substantially the same surface area as illustrated in FIG. 14. According to an embodiment, the platform 1400 may have a larger or smaller surface area than that of the base 1200. According to an embodiment, the inner-facing surface of the platform 1400 may be contoured to mate with an overhang that is formed on the edge 1280 of the base 1200 when the holder 1000 is in a collapsed position and an inclined position. When the inner-facing surface of the platform 1400 is mated with an overhang of the base 1200 while the holder 1000 is in an inclined position, this will add the advantage of preventing the platform 1400 from sliding down past the edge 1280 of the base 1200.

Figure 13:
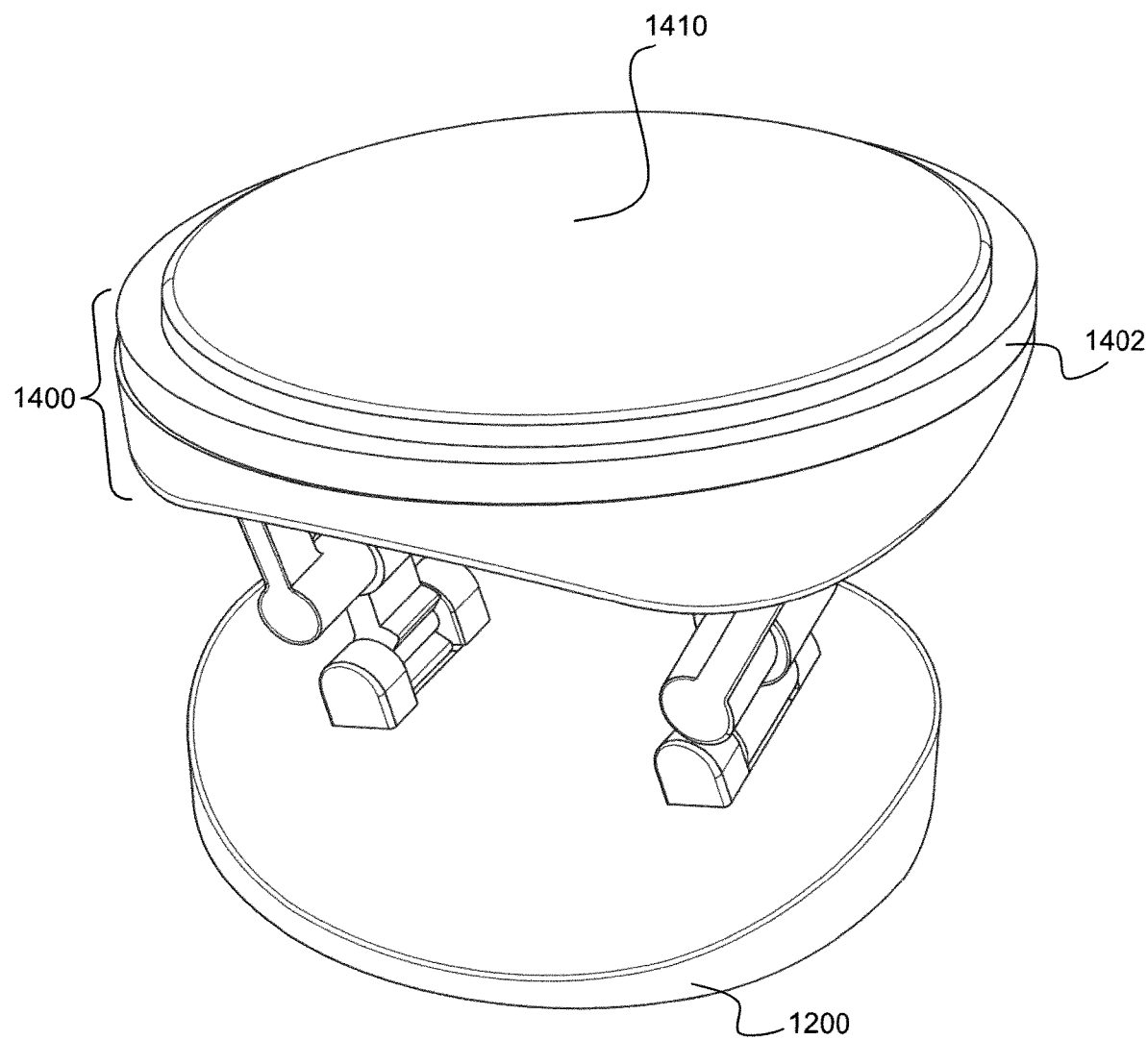
FIG. 13 is a bottom perspective view of the holder with two legs, according to an embodiment of the disclosure.

According to an embodiment, the outer-facing surface of the platform includes a fastener for attaching an object, such as a cell phone, to the holder 1000. As illustrated in FIG. 13, one example of the fastener is an adhesive layer 1410 on the outer-facing surface of the platform 1400. The adhesive layer 1410 is covered by a paper liner that is the same or similar to paper liner 66 in FIGS. 5 and 6. The paper liner may be peeled off to expose the adhesive layer 1410 for use to attach objects, such as a cell phone 68, to the platform 1400. Alternatively, the fastener may be a hook and loop type fastener such as Velcro® may be secured on the outer-facing surface of the platform 1400 and the object to removably attach the object to the platform 1400. Alternatively, the fastener may be in the form of magnets or magnet attracting metal and magnet combination may be secured on the outer-facing surface of the platform 1400 and the object to removably attach the object to the platform 1400. In yet another embodiment, the object may be removably adhered via suction to a suction cup secured on the outer-facing surface of the platform 1400. Other suitable ways may be provided to removably attach or fasten the object to the platform 1400.

Although various embodiments of the disclosed holder have been shown and described, modifications may occur to those skilled in the art upon reading the specification. The present application includes such modifications and is limited only by the scope of the claims.

What is claimed is:

1. A holder for attaching to a mobile device or other handheld object, the holder comprising:
   a base;
   a platform comprising: a fastener for attaching an object to the platform, and a disc that rotates about an axis that is orthogonal to an outer face of the platform;
   a first leg hingeably coupled to the base and the platform; and
   a second leg hingeably coupled to the base and the platform, each of the first leg and second leg comprising a first section hingeably coupled to the base and a second section hingeably coupled to the platform, the first section and the second section being hingeably coupled to each other.

2. The holder of claim 1, wherein the fastener comprises an adhesive layer.

3. The holder of claim 1, wherein the base comprises an overhang at an edge of the base.

4. The holder of claim 3, wherein an inner-facing surface of the platform is contoured to mate with the overhang.

* * * * *